US 6,647,627 B2
Nov. 18, 2003

(12) United States Patent
Nickel

(54) SEVERING IMPLEMENT WITH CUTTING CAPTURING FEATURE

(76) Inventor: Willis G. Nickel, 2618 Millbridge Ct., Dayton, OH (US) 45440

( * ) Notice: Subject to any disclaimer, the term of this patent is extended or adjusted under 35 U.S.C. 154(b) by 95 days.

(21) Appl. No.: 10/022,064

(22) Filed: Dec. 17, 2001

(65) Prior Publication Data

US 2003/0110640 A1 Jun. 19, 2003

(51) Int. Cl.[7] .............................................. B26B 13/00
(52) U.S. Cl. .......................................... 30/135; 30/134
(58) Field of Search ........................ 30/124, 131, 134, 30/135, 254, DIG. 6; 294/118

(56) References Cited

U.S. PATENT DOCUMENTS

| 108,091 | A | * | 10/1870 | Barbour | 30/134 |
|---|---|---|---|---|---|
| 438,292 | A | * | 10/1890 | Snyder | 30/135 |
| 547,408 | A | * | 10/1895 | Anderson | 30/135 |
| 594,072 | A | * | 11/1897 | Forde | 30/134 |
| 1,151,874 | A | * | 8/1915 | Harris | 30/134 |
| 1,666,253 | A | * | 4/1928 | Blincoe | 30/135 |
| 1,775,086 | A | * | 9/1930 | Bonehill | 30/134 |
| 1,876,218 | A | * | 9/1932 | Gee | 30/134 |
| 2,012,648 | A | * | 8/1935 | Wheeler | 30/134 |
| 4,018,037 | A | | 4/1977 | Weber | 56/16.7 |
| 4,464,837 | A | * | 8/1984 | Amstutz | 30/134 |
| 4,707,921 | A | | 11/1987 | Meyer et al. | 30/296 R |
| 5,315,762 | A | | 5/1994 | Dearman | 30/231 |
| 5,640,885 | A | | 6/1997 | Spence | 74/501.6 |

* cited by examiner

Primary Examiner—Hwei-Siu Payer
(74) Attorney, Agent, or Firm—Sturm & Fix LLP

(57) ABSTRACT

An improvement to a severing implement (10) having a pair of relatively movable blade elements (22) (33) that are pivotally connected together as at (52) wherein the improvement comprises a pair of cooperating gripping units (13) (14) for captively engaging and retrieving the severed portion (71) of an item (70) that is completely cut by the blade elements (22) (33) wherein the cooperating gripping units include a capture plate member (40) fixedly secured adjacent the cutting edge (39) of one of the blade elements (33) and a pusher bar member (50) vertically aligned with the cutting edge (23) of the other blade element (22).

14 Claims, 4 Drawing Sheets

SEVERING IMPLEMENT WITH CUTTING CAPTURING FEATURE

CROSS REFERENCE TO RELATED APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

1. Field of the Invention

The present invention relates to the field of severing implements in general and in particular to a severing implement having a cutting grasping feature.

2. Description of Related Art

As can be seen by reference to the following U.S. Pat. Nos. 5,315,762; 5,640,885; 4,707,921; and, 4,018,037, the prior art is replete with myriad and diverse long handled implements including pruning shears.

While all of the aforementioned prior art constructions are more than adequate for the basic purpose and function for which they have been specifically designed, they are uniformly deficient with respect to their failure to provide a simple, efficient, and practical severing implement such as a pruning shears construction having cooperating grabbing surfaces that will captively engage the severed portion of a branch or stem.

As most horticulturalists, gardeners, and landscapers are all too well aware, there are many instances wherein the simple severing of a branch or stem is not completely satisfactory and the actual removal and retrieval of the severed portion is not only desirable but also absolutely necessary in order to accomplish their objective.

As a consequence of the foregoing situation, there has existed a longstanding need among the aforementioned groups of individuals for a new and improved pruning shear construction that simultaneously severs and grasps a branch or stem to allow the severed portion to be retrieved by the user; and the provision of such a construction is a stated objective of the present invention.

BRIEF SUMMARY OF THE INVENTION

Briefly stated, the improvement to severing implements that forms the basis of the present invention comprises in general a pair of shearing blade units pivotally connected to one another in the conventional manner wherein one of the shearing units is provided with a pair of relatively movable cooperating gripping units that will allow the user to captively engage and retrieve the severed portion of a branch or stem.

As will be explained in greater detail further on in the specification, each of the shearing blade units has a handle portion and a blade portion; wherein, the handle portions are pivotally connected to one another and the blade portions are disposed on the handle portions so as to bring the severing blade edges into a slightly offset sliding overlapping relationship relative to one another to cut a branch or stem in a well recognized fashion.

The heart of this invention, however, resides in the provision of a pair of cooperating gripping units on the top surface of one of the blade portions of the shearing units; wherein, one of the cooperating gripping units includes a pusher bar that is aligned with an elongated central aperture in a capture plate that comprises the other cooperating gripping unit.

As the severing blade edges of the shearing blade units come into contact with the opposite sides of a limb or stem that is to be severed, the cooperating gripping units which are disposed on one of the severing blades approach the same sides of the item to be severed above the cut line. Then as the blade edges penetrate the opposite sides of the item, the cooperating gripping units come into progressively increasing frictional engagement such that once the item is severed, the gripping units have captively engaged the base of the severed portion to effect the subsequent removal and retrieval thereof.

BRIEF DESCRIPTION OF THE SEVERAL VIEWS OF THE DRAWINGS

These and other attributes of the invention will become more clear upon a thorough study of the following description of the best mode for carrying out the invention, particularly when reviewed in conjunction with the drawings, wherein.

DETAILED DESCRIPTION OF THE INVENTION

Figure 1:
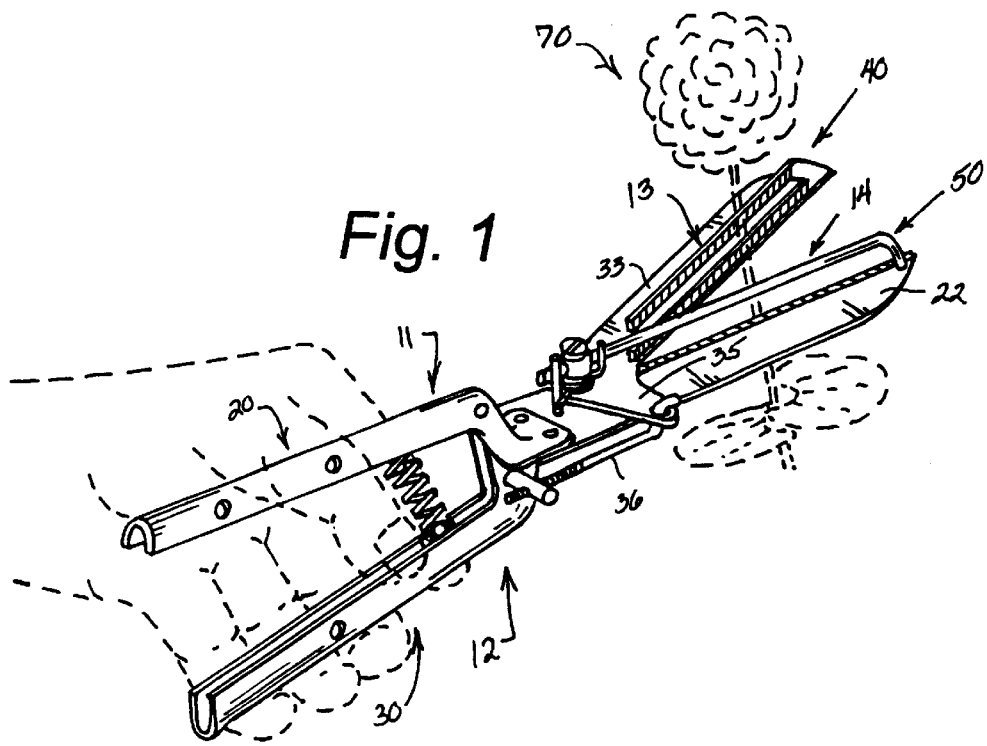
FIG. 1 is a perspective view of the cutting gripping pruning shears construction just prior to a cut being initiated.
Figure 2:
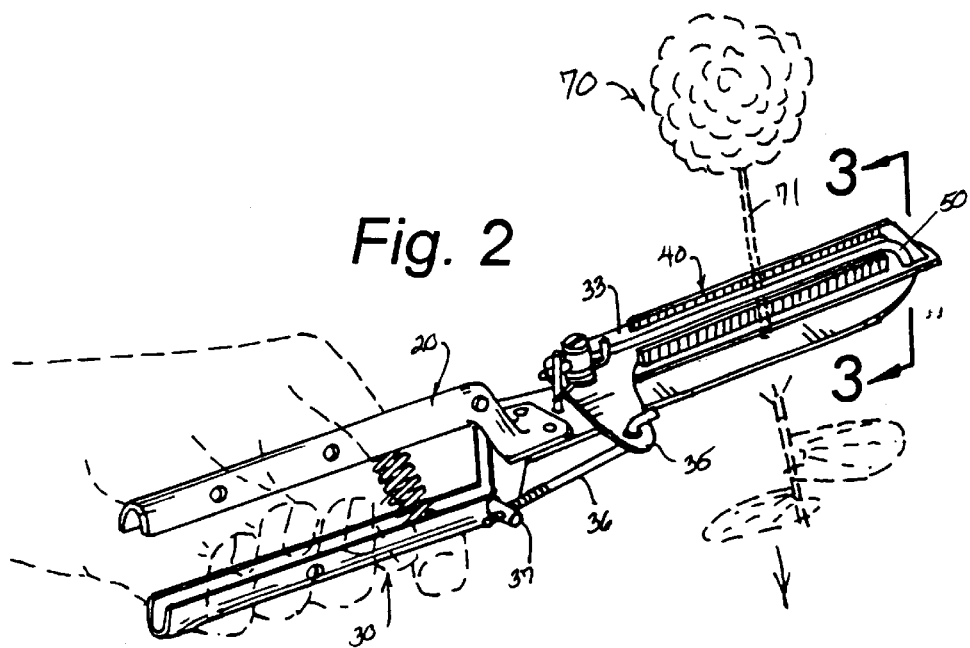
FIG. 2 is a perspective view similar to FIG. 1, with the cut having been completed.
Figure 3:
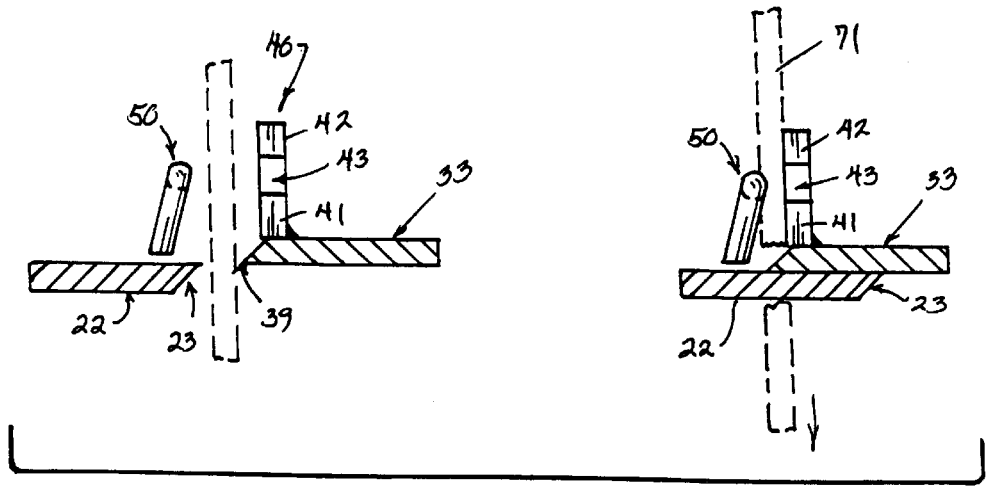
FIG. 3 is a cross-sectional view showing the relative position of the blade edges and the cooperating gripping units prior and subsequent to the cut.
Figure 4:
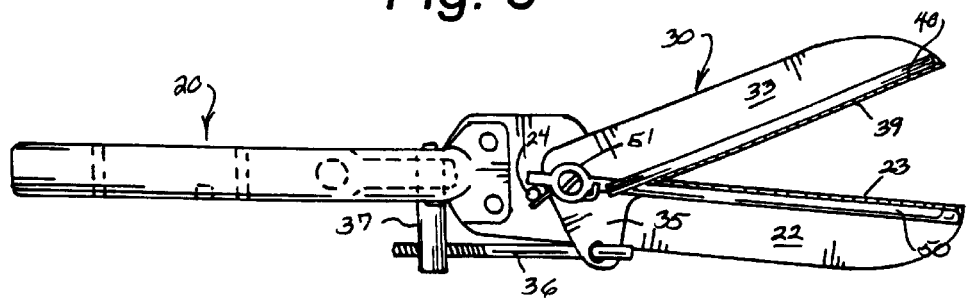
FIG. 4 is a top plan view of the pruning shears construction.
Figure 5:
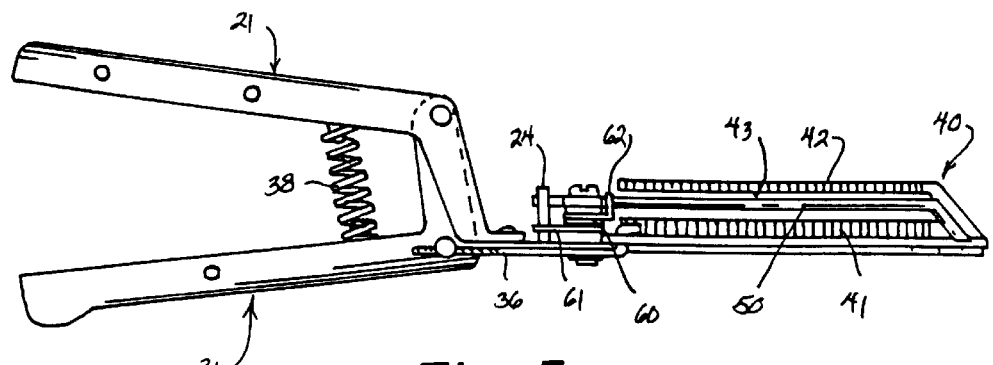
FIG. 5 is a side elevation view of the pruning shears construction.

As can be seen by reference to the drawings, and in particularly to FIG. 1, the severing implement construction that forms the basis of the present invention is designated generally by the reference number 10. The construction 10 comprises in general a fixed shearing blade unit 11 and a movable blade unit 12 pivotally associated relative to one another; wherein, at least one of the blade units 11 and 12 is provided with a pair of cooperating gripping units 13 and 14. These units will now be described in seriatim fashion.

Figure 6:
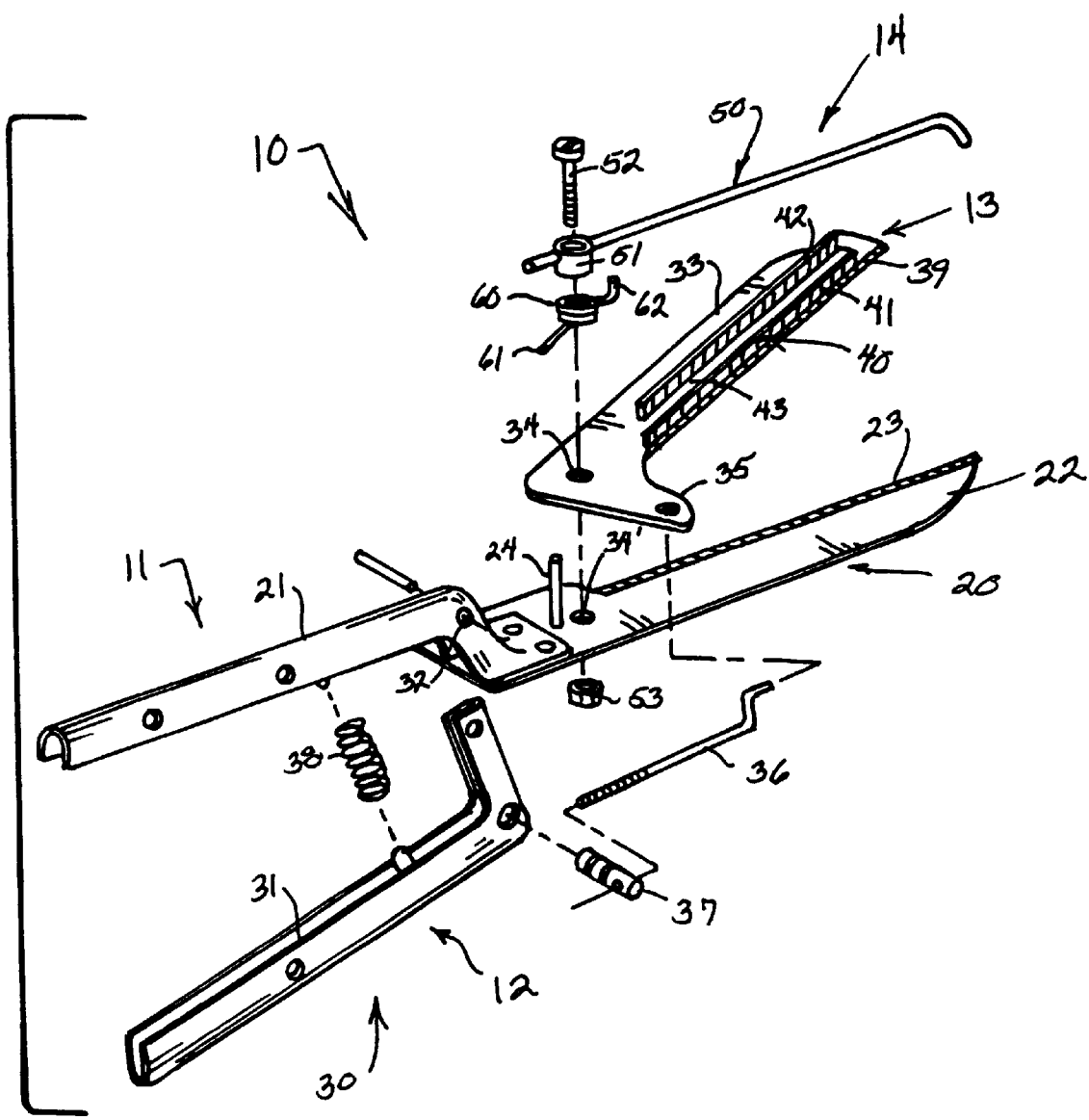
FIG. 6 is an exploded perspective view of the pruning shears construction.

As can best be appreciated by reference to FIG. 6, the fixed shearing blade unit 11 comprises a contoured fixed blade member 20 having a generally L-shaped upper handle element 21 fixedly secured to a generally thin flat lower blade element 22 having a tapered cutting edge 23.

In addition, the pivoted shearing blade unit 12 comprises an articulated shearing blade member 30 including a lower generally L-shaped handle element 31 pivotally secured as at 32 to the upper handle element 21 of the fixed blade member 20 in a well recognized fashion; wherein, the lower handle element 31 is operatively connected to a generally thin flat upper blade element 33 which is pivotally associated with the lower blade portion 22 in a manner that will be described next.

Still referring to FIG. 6, it can be seen that the inboard end 34 of the upper blade element 33 is pivotally secured as at 34 to the inboard end of the lower blade portion 22 and further provided with an outwardly extending apertured moment arm flange 35 that receives the outboard end of an actuating lever 36 whose inboard end is connected to an extension rod 37 that projects outwardly from the bend in the lower generally L-shaped blade member 30.

Furthermore, a spring biasing element 38 is interposed between the upper 21 and lower handle portions to bias the tapered cutting edge 39 of the blade element 33 away from the tapered cutting edge 23 of the lower blade portion 22; wherein, the inboard end of the lower blade element 22 is further provided with a vertical post element 24 that will limit the opening movement of the upper 33 and lower blade elements 22.

In operation, when the upper 21 and lower handle elements 21 31 are forced together against the action of the spring biasing element 38, the actuating lever 36 will force the movable upper blade element 33 into a closed overlapping relationship relative to the fixed lower blade element 22 in a well recognized manner.

At this juncture, it should be noted that while this invention has been specifically described with respect to pruning shears, the teachings and structure that follow are applicable to any severing implement having two relatively movable cutting blades such as scissors, snips, hedge trimmers and the like.

As shown in FIGS. 1,2,5 and 6, the pair of cooperating gripping units 13 and 14 are operatively disposed on the upper blade element 33; wherein, one of the cooperating gripping units 13 comprises an elongated generally U-shaped capture plate member 40 having a lower capture arm 41 and an upper capture arm 42 defining a capture opening 43 wherein, the lower capture arm 41 is fixedly secured to the upper movable blade element 33 proximate the blade edge 39; and, the inwardly facing surfaces of the capture arms 41 42 are provided with a ridged friction enhancing contour for reasons that will be explained presently.

In addition, the other of the cooperating gripping units 14 comprises a pusher bar member 50 pivotally suspended above the upper blade element 33 by a rotatable hollow collar 51 dimensioned to receive a pivot rod 52 that passes through the pivot aperture 34 on the upper blade element 33 and a complementary aperture 34' formed on the lower blade element 22. The pivot rod 52 is operatively connected to both the upper 33 and lower 22 blade elements by a conventional fastener 53 and the hollow column collar 51 is further provided with a coiled spring element 60 whose purpose and function will be described presently.

Returning once more to FIGS. 1,2, 5 and 6, it can be seen that the coiled spring element 60 has a horizontally disposed lower spring leg 61 that is adapted to engage the vertical stop post 24 on the lower blade element 22 and also has a vertically disposed upper spring arm 62 that is adapted to engage the inboard end of the pusher bar member 50.

Turning now to FIGS. 1 through 3, and 5, it can be seen that the pusher bar member 50 is aligned in the vertical plane with the sharpened blade edge 23 of the lower blade element 22 and horizontally aligned with the capture opening 43 in the capture plate member 40. As a result of the arrangement of the coiled spring element 60, the pusher bar member maintains this vertical alignment with the edge 23 of the lower blade element 33 even as the blade elements 22 and 33 are brought together in the process of cutting and retrieving an item 70 such as a flower wherein the lower end of the severed portion 71 of the item 70 is forced by the pusher bar member 50 against the capture bar member 40 forcing a portion of the severed portion 71 partially within the capture opening 43 so that the severed portion 71 will remain captively engaged as long as the blade elements 22 33 are maintained in their closed position.

Figure 7:
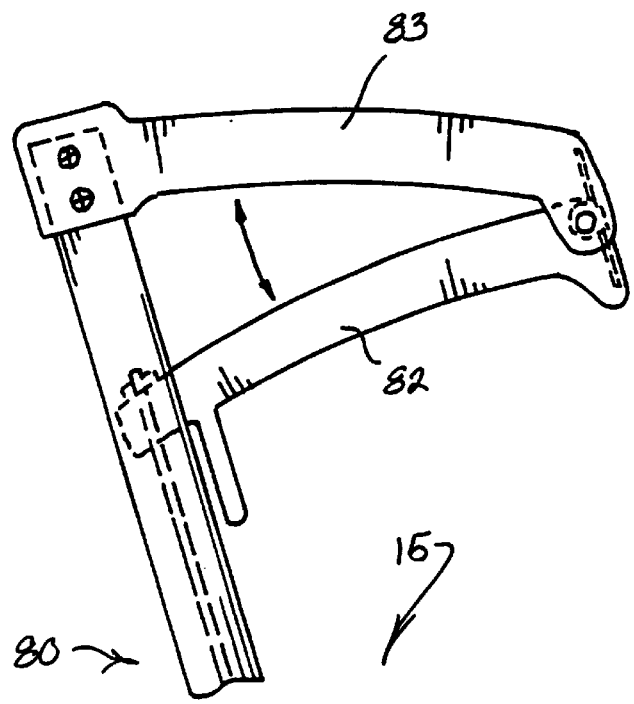
FIG. 7 is a perspective view of an extension handle adapter envisioned for use with the pruning shears construction.
Figure 7:
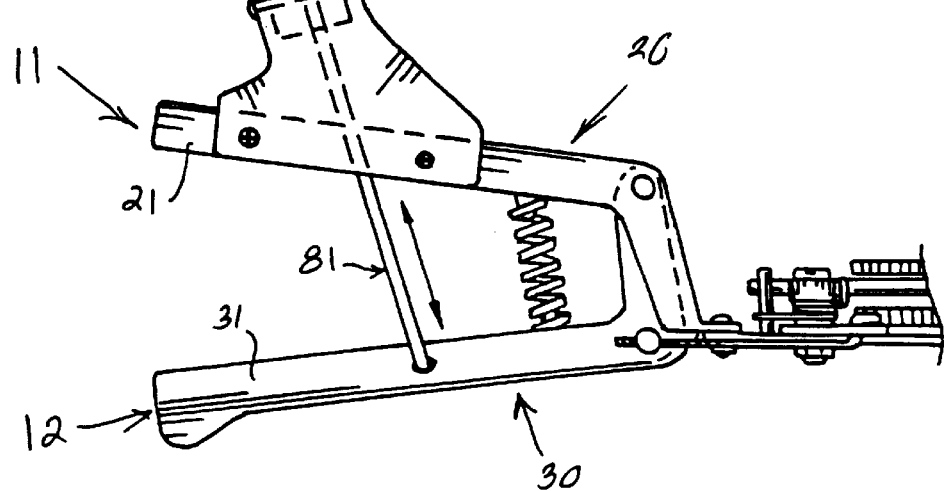

Turning now to FIG. 7, it can be seen that this invention also contemplates the use of an optional extension actuator unit 15 including an elongated hollow extension pole member 80 having its lower end fixedly secured to the handle element 21 of the fixed blade unit 11; wherein, the interior of the hollow extension pole member 80 whose lower end is operatively connected to the handle element 31 of the movable blade unit 12.

In addition, the upper end of the actuator rod 81 is connected to an actuator lever 82 that is pivotally connected to an extension arm 83 formed on the upper end of the extension pole member 80 whereby when the actuator lever 82 is depressed against the extension arm 83, the jaws of the pruning shears construction will be forced together in a well recognized fashion.

Once again, it must be emphasized that the components of the cooperating gripping units 13 and 14 can be incorporated into any severing implement having a pair of relatively movable jaw blades wherein one or more of the blades are provided with a pair of cooperating gripping units that will grasp the severed portion of an item that has been severed by the implement 10.

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

Having thereby described the subject matter of the present invention, it should be apparent that many substitutions, modifications, and variations of the invention are possible in light of the above teachings. It is therefore to be understood that the invention as taught and described herein is only to be limited to the extent of the breadth and scope of the appended claims.

What is claimed is:

1. An improvement to severing implements having a pair of relatively moveable blade elements that are pivotally connected to one another wherein the improvement comprises:

means associated with the blade elements for captively engaging the severed portion of an item that has been completely severed by the movable blade elements wherein, said means comprises a pair of cooperating gripping units including a capture plate member fixedly disposed adjacent the cutting edge of one of the blade elements and a pusher bar generally aligned with the cutting edge of the other blade element and adapted to frictionally engage the severed portion of the item against the capture plate member; and; wherein, the capture plate member is provided with an opening adapted to receive a part of the severed portion of the cut item.

2. The improvement as in claim 1; wherein, at least one of the capture plate member and the pusher bar are provided with a high co-efficient of friction surface.

3. The improvement as in claim 1; wherein, the capture plate member has a portion adapted to receive a part of the severed portion of the cut item.

4. The improvement as in claim 1; wherein, the capture plate member includes an upper capture arm vertically spaced from the cutting edge of one of the blade elements.

5. The improvement as in claim 4; wherein, said pusher bar is vertically spaced from the cutting edge of the other of the blade elements.

6. The improvement as in claim 1; wherein, said capture plate member includes an upper capture arm and a lower capture arm defining said opening, and wherein said opening is elongated.

7. The improvement as in claim 6; wherein, said pusher bar is aligned with the elongated opening in the capture plate member.

8. The improvement as in claim 1; wherein, the pusher bar is pivotally disposed on said one of the blade elements.

9. The improvement as in claim 8; wherein, at least one of the capture plate member and the pusher bar are provided with a high co-efficient of friction surface.

10. The improvement as in claim 8; wherein, the capture plate member has a portion adapted to receive a part of the severed portion of the cut item.

11. The improvement as in claim 8; wherein, the capture plate member includes an upper capture arm vertically spaced from the cutting edge of said one of the blade elements.

12. The improvement as in claim 8; wherein, said pusher bar is vertically spaced from the cutting edge of the other of the blade elements.

13. The improvement as in claim 8; wherein, said capture plate member includes an upper capture arm and a low capture arm defining said opening, and wherein said opening is elongated.

14. The improvement as in claim 8; wherein, said pusher bar is aligned with the elongated opening in the capture plate member.

* * * * *